(12) United States Patent
Newell (10) Patent No.: US 11,657,729 B2
(45) Date of Patent: May 23, 2023

(54) CHILDHOOD DEVELOPMENT SYSTEM

(71) Applicant: DISH Network L.L.C., Englewood, CO (US)

(72) Inventor: Nicholas Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 350 days.

(21) Appl. No.: 16/996,734

(22) Filed: Aug. 18, 2020

(65) Prior Publication Data

US 2022/0058979 A1    Feb. 24, 2022

(51) Int. Cl.
*G09B 19/00*    (2006.01)
*G06N 5/04*    (2023.01)
*G06N 20/00*    (2019.01)

(52) U.S. Cl.
CPC .............. *G09B 19/00* (2013.01); *G06N 5/04* (2013.01); *G06N 20/00* (2019.01)

(58) Field of Classification Search
CPC ........... G09B 19/00; G06N 20/00; G06N 5/04
USPC ........................................................ 434/238
See application file for complete search history.

(56) References Cited

U.S. PATENT DOCUMENTS

| | | | | |
|---|---|---|---|---|
| 2012/0329025 | A1* | 12/2012 | Yang | G09B 19/00 434/322 |
| 2015/0325132 | A1* | 11/2015 | Garza Sada | G09B 19/00 434/319 |
| 2016/0151672 | A1* | 6/2016 | Barnes | G06Q 30/02 434/247 |
| 2018/0285319 | A1* | 10/2018 | Nieuwenhuys | G06N 20/00 |
| 2018/0341903 | A1* | 11/2018 | Keen | G06N 20/00 |
| 2019/0318008 | A1* | 10/2019 | Cruz Huertas | G06F 16/4387 |
| 2020/0143802 | A1* | 5/2020 | Newell | G06N 20/00 |

\* cited by examiner

*Primary Examiner* — Jay Trent Liddle
*Assistant Examiner* — Alyssa N Brandley
(74) *Attorney, Agent, or Firm* — Kilpatrick Townsend & Stockton, LLP (57) ABSTRACT

A childhood development system may capture audio and video in a home environment in which a child resides. The captured audio and the captured video may be filtered to remove audio and video corresponding to persons other than the child. Based upon information from the filtered video and the filtered audio, multiple scores can be calculated for the child using multiple trained machine-learning models. The scores can be compared with various stored activity score bundles. An indication of one or more compatible activities mapped to the activity score bundles that best match the child's scores is output.

20 Claims, 5 Drawing Sheets

Childhood Development Feedback

We see that you signed up for Community Theatre Production for Kids. If you provide feedback, we can help provide you and others better recommendations! Please answer this simple questionnaire:

1. During the activity, what percentage of the time is your child physically moving?

| 0-100% |

2. On a scale of 1-10, how excited is your child to attend the activity?

| 1-10 |

3. How many other kids does your child talk to during the activity?

| Enter Number |

4. Does your child ask questions to you about the activity?

| Yes/No |

5. How would you assess your child's mood during the activity? (Select all that apply)

| Happy | Bored | Frustrated | Shy |
| Angry | Curious | Sad | Distracted |

CHILDHOOD DEVELOPMENT SYSTEM

BACKGROUND

A significant portion of a child's development occurs before the child turns five. At this young age, a child can have significant difficultly expressing or identifying the types of activities that he or she would enjoy participating in. At this age, the child likely has not been exposed to a large number of sports, arts, musical instruments, or other forms of activities. Therefore, a child could be unaware of even the existence of a type of activity that the child might enjoy and benefit from.

SUMMARY

Various embodiments are described related to a method for enrolling a child with a compatible activity. In some embodiments, a method for enrolling a child with a compatible activity is described. The method may comprise capturing, using at least some of a plurality of home automation devices, audio in a home environment in which the child resides. The method may comprise capturing, using at least some of the plurality of home automation devices, video in the home environment in which the child resides. The method may comprise filtering the captured audio and the captured video to remove audio and video corresponding to persons other than the child. The method may comprise, based upon information from the filtered video and the filtered audio, calculating, using a plurality of trained machine-learning models, a plurality of scores for the child. Each score of the plurality of scores may correspond to a different childhood developmental characteristic. The method may comprise comparing the plurality of scores with a plurality of activity score bundles. The method may comprise outputting an indication of the compatible activity mapped to the activity score bundle of the plurality of activity score bundles that may best match the plurality of scores.

Embodiments of such a method may comprise one or more of the following features: a first trained machine-learning module of the plurality of trained machine-learning models may score a physical confidence of the child. A second trained machine-learning module of the plurality of trained machine-learning models may score a social confidence of the child. A third trained machine-learning module of the plurality of trained machine-learning models may score an intellectual confidence of the child. A fourth trained machine-learning module of the plurality of trained machine-learning models may score an emotional confidence of the child. Each of the plurality of trained machine-learning models may be pre-trained feed-forward neural networks. The method may further comprise, prior to calculating the plurality of scores for the child, performing a computer vision process to identify visual characteristics of a scene that may comprise the child. The identified visual characteristics may be used as part of the information to calculate the plurality of scores for the child. The method may further comprise, prior to calculating the plurality of scores for the child, performing an audio analysis to identify auditory characteristics of a scene that may comprise the child. The identified auditory characteristics may be used as part of the information to calculate the plurality of scores for the child. The method may further comprise, after outputting the indication of the compatible activity and after the compatible activity has started being performed by the child: capturing audio of the child performing the compatible activity. The method may further comprise, after outputting the indication of the compatible activity and after the compatible activity has started being performed by the child: capturing video of the child performing the compatible activity. The method may further comprise, after outputting the indication of the compatible activity and after the compatible activity has started being performed by the child: filtering the captured audio and the captured video of the child performing the compatible activity to remove audio and video corresponding to persons other than the child. The method may further comprise, after outputting the indication of the compatible activity and after the compatible activity has started being performed by the child: based upon information from the filtered video and the filtered audio, determining an engagement level of the child with the compatible activity. The method may further comprise, after outputting the indication of the compatible activity and after the compatible activity has started being performed by the child: providing, via a mobile device, a questionnaire to a caregiver of the child. The questionnaire may request feedback about the child's involvement in the compatible activity. The method may further comprise, after outputting the indication of the compatible activity and after the compatible activity has started being performed by the child: receiving, from the mobile device, responses to the questionnaire. The method may further comprise, after outputting the indication of the compatible activity and after the compatible activity has started being performed by the child: recommending a second activity for the child at least partially based on the responses to the questionnaire and the plurality of scores. Calculating the plurality of scores and comparing the plurality of scores may be performed by a cloud-based server system. Biometric data may be captured for the child. Calculating the plurality of scores for the child can be further based on the captured biometric data for the child. Outputting the indication of the compatible activity mapped to the activity score bundle of the plurality of activity score bundles that best matches the plurality of scores may comprise outputting a report that indicates the plurality of scores, the compatible activity, and an option to enroll the child in the compatible activity. The method may further comprise, after outputting the report, outputting a notification that a change in compatible activities identified for the child have been identified. Each activity score bundle of the plurality of activity score bundles may define at least four scores, comprising a physical confidence score, an emotional confidence score, a social confidence score, and an intellectual confidence score.

In some embodiments, a childhood development system is described. The system may comprise a plurality of home automation devices distributed within a home environment in which a child may reside. The system may comprise a childhood development server system that may wirelessly communicate with the plurality of home automation devices. The system may comprise one or more memories. The system may comprise one or more processors communicatively coupled to the one or more memories configured to capture, using at least some of a plurality of home automation devices, audio in a home environment in which the child may reside. The system may comprise one or more processors communicatively coupled to the one or more memories configured to capture, using at least some of the plurality of home automation devices, video in the home environment in which the child may reside. The system may comprise one or more processors communicatively coupled to the one or more memories configured to filter the captured audio and the captured video to remove audio and video corresponding to persons other than the child. The system may comprise one or more processors communicatively coupled to the one or more memories configured to, based upon information from the filtered video and the filtered audio, calculating, using a plurality of trained machine-learning models, a plurality of scores for the child. Each score of the plurality of scores may correspond to a different childhood developmental characteristic. The system may comprise one or more processors communicatively coupled to the one or more memories configured to compare the plurality of scores with a plurality of activity score bundles. The system may comprise one or more processors communicatively coupled to the one or more memories configured to output an indication of the compatible activity mapped to the activity score bundle of the plurality of activity score bundles that best matches the plurality of scores.

Embodiments of such a method may include one or more of the following features: a first trained machine-learning module of the plurality of trained machine-learning models may score a physical confidence of the child. A second trained machine-learning module of the plurality of trained machine-learning models may score a social confidence of the child. A third trained machine-learning module of the plurality of trained machine-learning models may score an intellectual confidence of the child. A fourth trained machine-learning module of the plurality of trained machine-learning models may score an emotional confidence of the child. Each activity score bundle of the plurality of activity score bundles may define at least four scores, comprising a physical confidence score, an emotional confidence score, a social confidence score, and an intellectual confidence score. Each of the plurality of trained machine-learning models may be pre-trained feed-forward neural networks. The one or more processors may be further configured to perform a computer vision process to identify visual characteristics of a scene that may comprise the child prior to calculating the plurality of scores for the child. The identified visual characteristics may be used as part of the information to calculate the plurality of scores for the child. The one or more processors may be further configured to perform an audio analysis to identify auditory characteristics of a scene that may comprise the child prior to calculating the plurality of scores for the child. The identified auditory characteristics may be used as part of the information to calculate the plurality of scores for the child. The one or more processors may be further configured to, after outputting the indication of the compatible activity and after the compatible activity has started being performed by the child: filter captured audio and captured video of the child performing the compatible activity to remove audio and video corresponding to persons other than the child. The one or more processors may be further configured to, after outputting the indication of the compatible activity and after the compatible activity has started being performed by the child: based upon information from the filtered video and the filtered audio, determine an engagement level of the child with the compatible activity. The one or more processors may be further configured to provide, via a mobile device, a questionnaire to a caregiver of the child. The questionnaire may request feedback about the child's involvement in the compatible activity. The one or more processors may be further configured to receive, from the mobile device, responses to the questionnaire. The one or more processors may be further configured to recommend a second activity for the child at least partially based on the responses to the questionnaire and the plurality of scores. The one or more processors being configured to output the indication of the compatible activity mapped to the activity score bundle of the plurality of activity score bundles that best matches the plurality of scores may comprise the one or more processors being configured to output a report that indicates the plurality of scores, the compatible activity, and an option to enroll the child in the compatible activity.

DETAILED DESCRIPTION

A child can be monitored during the course of his normal day. Using home automation devices distributed throughout a house, a child can be monitored using video, audio, or both. From captured video and audio, various characteristics about the child's behavior can be determined, such as: what objects the child tends to interact with, how long the child interacts with a particular object, whether the child tends to perform more active or sedentary activities, the particular words the child speaks, what triggers an emotional response from the child, how often and how long the child interacts with others, etc.

These characteristics may be used to perform a multi-part analysis of the child. The child may have his characteristics scored in relation to physical, emotional, social, and intelligence scores. Each of these scores may be indicative of how much a child likes engaging in an activity that involves the characteristic. Machine-learning models may be trained, such as one machine-learning model per characteristic. The output scores can be compared with bundles of scores that have been mapped to particular activities. The closest match or matches between the output scores and the bundles of scores may be indicative of activities that might be a good match for the child.

Such activities may be identified to a caretaker, such as a parent or nanny, of the child. Such activities, since they are selected based on observing the child and a database of scored activities, may serve the benefit of suggesting activities that the caretaker would not otherwise have thought of. For example, a parent that typically is focused on enrolling his child in sports may not have considered that an art program would have been better suited to his child's needs.

A caretaker may receive a report, such as through a delivery to the caretaker's mobile device, that recommends one or more activities based on the scoring of the child. The caretaker may be given the opportunity to enroll the child in the activity through the report. Feedback may also be collected. Video and/or audio may be captured while the child is participating in the activity and may be evaluated for the child's engagement. If video, audio, or both are not available (or in addition to such feedback), the caretaker may receive a questionnaire to complete about the child's engagement with the activity. Based on feedback, one or more additional or alternative activities may be suggested.

The following description focuses on embodiments in which a child is matched with one or more activities for the child to participate in. In other embodiments, the person monitored may be other than a child. For example, an adult (or, more generally, a person) may be similarly monitored and analyzed to identify television channels, television programs, or more, generally, media, that the adult may enjoy. Therefore, for example, a person's interactions with the world can be used to identify media that the person may enjoy consuming.

Figure 1:
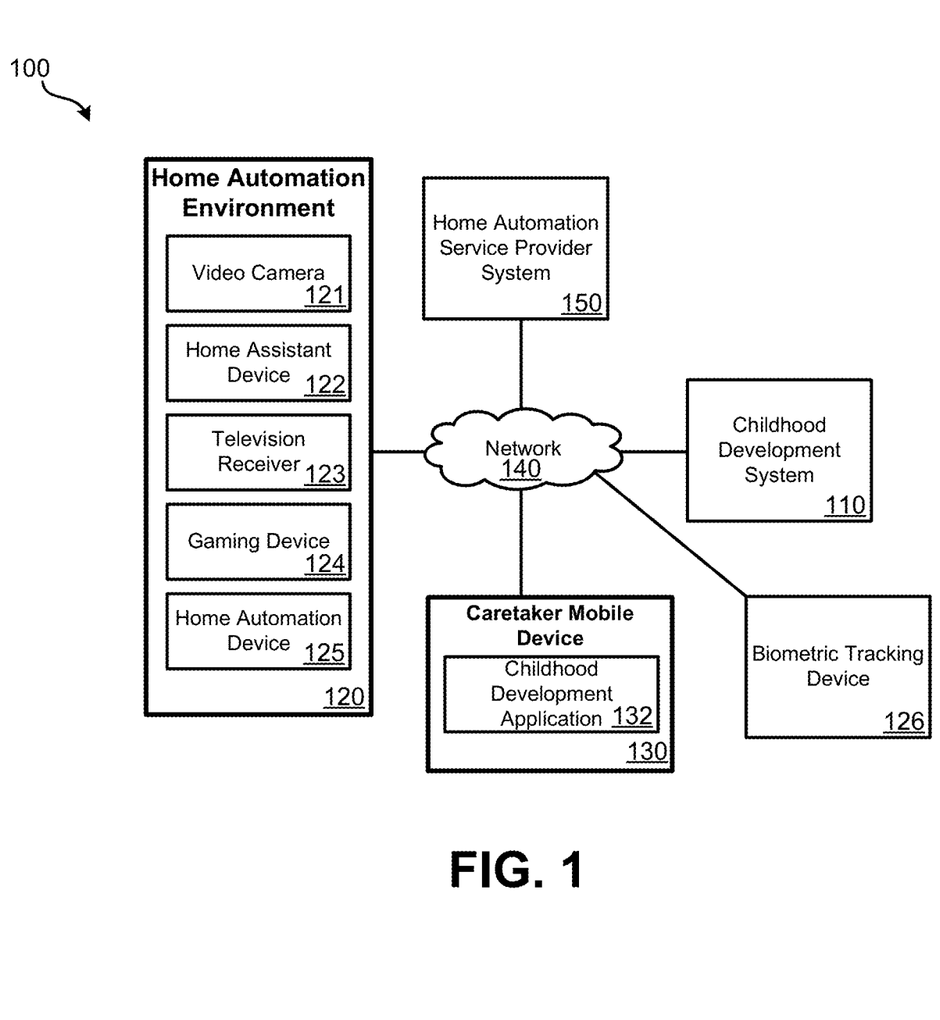
FIG. 1 illustrates a childhood development system.

FIG. 1 illustrates a childhood development monitoring system 100 ("system 100"). System 100 can include: childhood development system 110; home automation environment 120; biometric tracking device 126; caretaker mobile device 130 that executes childhood development application 132; and network 140.

Childhood development system 110 may be executed by a computerized device that is installed within home automation environment 120, such as a dedicated hub device that receives information from various home automation devices. Alternatively, childhood development system 110 may be incorporated as part of a particular home automation device, such as television receiver 123. In still other embodiments, the functions of childhood development system 110 may be performed by a cloud-based server system. Further detail regarding the various embodiments of childhood development system 110 are provided in relation to FIG. 2.

Home automation environment 120 represents the home automation devices that are network-enabled and are positioned within a home in which a child, for whom childhood development monitoring is to be performed, resides. The home automation devices may be manufactured by different manufacturers and/or supplied by different companies. However, each home automation device may be capable of capturing video, audio, or both and outputting such video, audio, or both via a network. Various examples of home automation devices are provided, including: video camera 121; home assistant device 122; television receiver 123; gaming device 124; and home automation device 125. Video camera 121 may stream video and, possibly, audio via network 140. Home assistant device 122 may stream audio and, possibly, video via network 140. Television receiver 123 may have a built-in microphone that can be used to capture audio and stream via network 140. Gaming device 124 may stream audio, captured video, or both. Home automation device 125 can represent various other types of home automation devices. Innumerable other forms of network-connected smart home devices may be present in the home environment, such as smart doorbells, smart televisions, smart appliances, smart smoke detectors, smart thermostats, smart door locks, smart alarm systems, smart cleaning robots, etc.

While at least some of the home automation devices present in home automation environments may provide video and/or audio data, other forms of data may also be provided by home automation devices. For instance, data indicative of a television channel being watched, a video game being played, the amount of time such media is output, etc. may be output by various forms of home automation devices. Such data can be referred to as "metadata."

Biometric tracking device 126 can include one or more devices that within home automation environment 120 and/or outside of home automation environment 120 tracks one or more biometric characteristics of the child. For instance, such biometric characteristics can include heart rate; breathing rate; motion; gaze, etc. Biometric tracking device 126 may be a wearable device, such as a watch, a bracelet, a necklace, glasses, etc. Data collected by biometric tracking device 126 may be provided to childhood development system 110 or to some other cloud-based server system.

Via network 140, such video data, audio data, biometric data, and/or metadata may be provided directly to childhood development system 110. In some embodiments, some or all home automation devices may provide video data, audio data, and/or metadata to one or more home automation service provider systems 150. Such video, audio, and metadata may be used by the one or more home automation service provider systems to perform other smart-home activities, such as security, gaming, and home assistant services. Childhood development system 110 may be provided credentials that allow childhood development system 110 to access such stored data from the one or more home automation service provider systems such as home automation service provider system 150.

Childhood development system 110 may be able to communicate with a caretaker that cares for the child via caretaker mobile device 130. The caretaker may be a parent, sibling, nanny, or other form of caretaker that is responsible for educating and raising the child, at least part of the time. The caretaker may be responsible for providing consent for the video data, audio data, and metadata to be collected and analyzed for the child. Caretaker mobile device 130 may be a smartphone, tablet computer, gaming device, or, more generally, some other form of computerized device (e.g., desktop computer, laptop computer). Caretaker mobile device 130 may access a website hosted by childhood development system 110 or may execute a specialized application, referred to as childhood development application 132. Generally, childhood development application 132 serves to output the childhood development data collected by childhood development system 110 and allows a caretaker to provide feedback on the child to childhood development system 110. Similar interactions with the caretaker may be realized via a website of childhood development system 110. Childhood development application 132, or a website accessible via caretaker mobile device 130, may provide interfaces as detailed in relation to FIGS. 3 and 4.

Network 140 may include one or more private and/or public networks that allow for communication between components of system 100. Network 140 may include a wireless local area network that serves as an access point to the Internet for devices in home automation environment 120. Network 140 also includes the Internet, which allows for communication with childhood development system 110 in some embodiments. Network 140 can also include the network of a cellular service provider that provides Internet access to caretaker mobile device 130.

Figure 2:
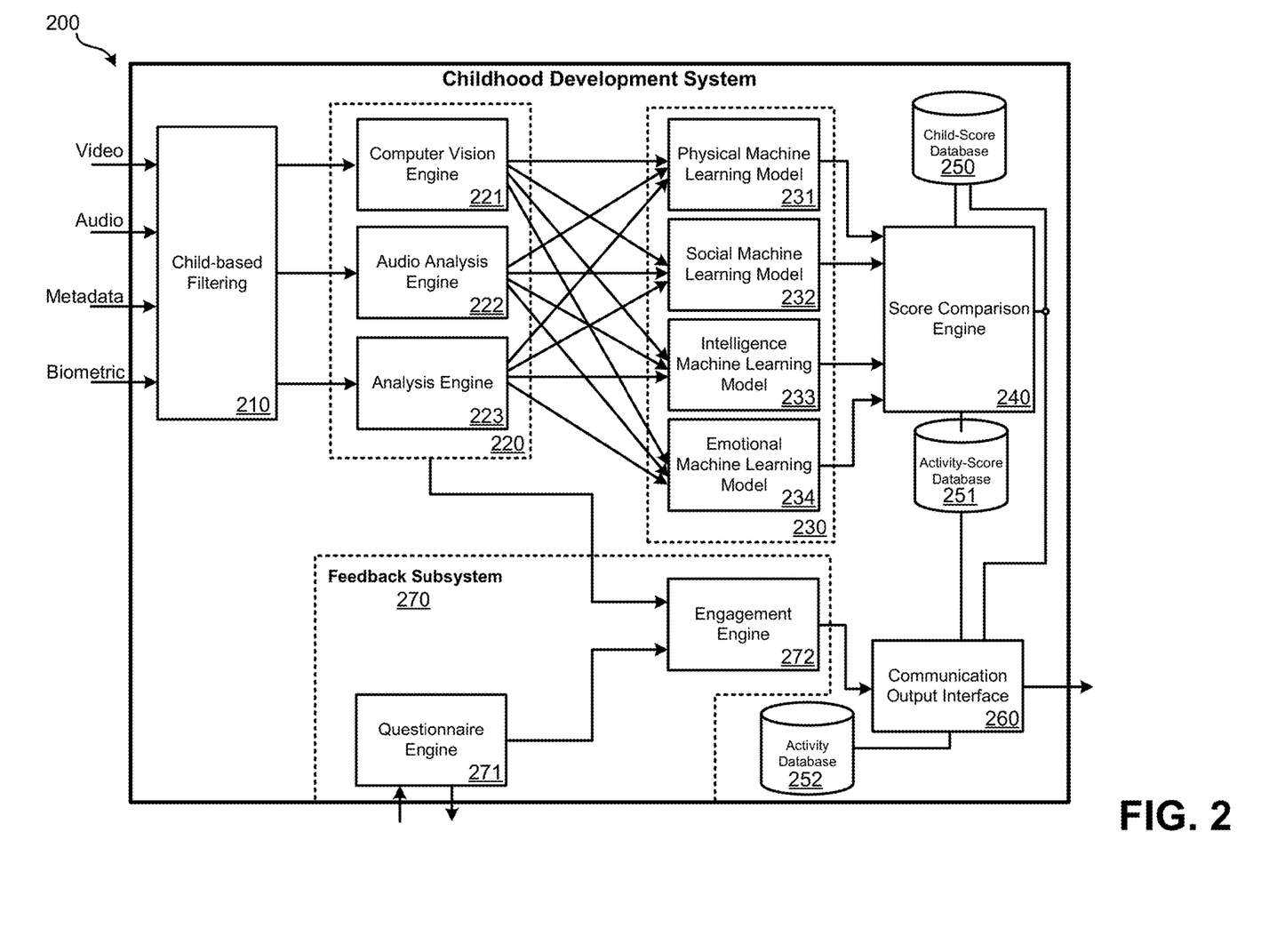
FIG. 2 illustrates an embodiment of a childhood development system.

FIG. 2 illustrates an embodiment of a childhood development system 200. Childhood development system 200 can represent a possible embodiment of childhood development system 110 of FIG. 1. Childhood development system 200 may be implemented using one or more computerized devices. As detailed in relation to childhood development system 110, childhood development system 200 may be implemented on a home automation device, on a dedicated hub device located in the home automation environment or on a cloud-based server system (which may be distributed and use more than one cloud-based server systems).

Whether implemented on a home automation device, in a dedicated hub device, or on a cloud-based server system, childhood development system 200 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Childhood development system 200 can include: child-based filtering 210; first-layer processing 220; machine learning layer 230; score comparison engine 240; databases that can include child-score database 250, activity-score database 251, and activity database 252; communication output interface 260; questionnaire engine 271; and engagement engine 280. Other embodiments can include fewer or greater numbers of components. In some embodiments, various components may be combined or a component may have its functionality divided into multiple components.

Child-based filtering 210 may perform an initial filtering process to remove video, audio, biometric data, and/or other data that does not correspond to the child intended to be monitored. For video, an initial facial recognition process (or other form of recognition process) may be performed to determine if the child to be monitored is present. If the child is present, the video may be maintained. If other persons are also present in the video, the faces of such persons may be blurred to maintain privacy. If the child is not present in the video, the video may be discarded, such as by deleting the video. For audio, a voice recognition process may be performed to determine if the audio corresponds to the child to be monitored. If the child is determined to be present based on the audio, the audio may be maintained. If the child's voice is not detected in an audio clip, the audio clip may be discarded, such as by deleting the received audio. Similarly for metadata, if the metadata does not correspond to the child (e.g., to an account of the child on the gaming device), it may be deleted. If the metadata does correspond to the child, the metadata may be maintained. For biometric data, if the biometric device is mapped to the child, any biometric data obtained from the biometric device, such as heartrate and/or breathing rate may be assumed to correspond to the child. Data that is not discarded by child-based filtering 210 may be passed to first-layer processing 220.

First-layer processing 220 may process received video, audio, biometric data, and/or metadata into a feature set that can be analyzed by machine-learning models. Various forms of pre-processing may be present to convert received data into a form appropriate to be fed as feature bundles to machine learning layer 230. Computer vision engine 221 may analyze video of the child received from child-based filtering 210. Computer vision engine 221 may output: indications of types of objects near the child or being interacted with by the child; an indication of the amount of time the child stays relatively still and/or is moving; an indication of the amount of time the child interacts with other children, adults, and/or plays by himself; an indication of the child's perceived mood based on facial expressions and/or movements, etc. Data indicating such characteristics along with timestamp data may be output by computer vision engine 221 and provided to machine learning layer 230.

Audio analysis engine 222 can analyze the audio received from child-based filtering 210. Audio analysis engine 222 may analyze the audio to determine: keywords spoken by the child; the child's mood; whether the child is talking, yelling, singing, etc.; the amount of time the child is speaking compared to the amount time the child is quiet; the relative amount of questions the child asks; a relative amount of time the child spends speaking to children and/or adults; the child's emotional state based on his speech; the types of objects with which the child is interacting (e.g., if a video game's audio can be detected in the audio stream). Data indicating such characteristics along with timestamp data may be output by audio analysis engine 222 and provided to machine learning layer 230.

Analysis engine 223 may process received metadata from child-based filtering 210 to place the metadata into a format appropriate for machine learning layer 230. This can include adding a timestamp and/or converting the metadata to a category of metadata that can be used by machine learning layer 230. For instance, if metadata indicates that the child is watching a particular television program, such as "Paw Patrol," analysis engine 223 may generalize this metadata to output an indication that the child is viewing a non-educational cartoon along with a timestamp.

Embedded within first-layer processing 220 may be one or more machine learning models, such as a convolutional neural network within computer vision engine 221. Various machine learning models may also be embedded within audio analysis engine 222 and analysis engine 223 to perform a first layer of analysis on the captured video, audio, metadata, and/or biometric data.

Each machine learning model of machine learning layer 230 may have access to the features output by first-layer processing 220. Features may be buffered for a period of time, such as one day, one week, or one month, to get a more comprehensive picture of the activity of the child. Each of the machine learning models of machine learning layers 230 can access the features output by first-layer processing 220 that is used by the particular machine learning layer to perform scoring.

A different machine-learning model may be present for each type of "connection" that a child can make with the external world. A type of connection refers to a way in which the child interacts with the world around him. In some embodiments, four types of connections are analyzed: physical connections; emotional connections; intellectual connections; and social connections. For example, a child that prefers physically interacting with sports compared to puzzles would likely have a preference for physical connections compared to intellectual connections. Notably, this does not reflect on the child's intellect; rather, it indicates the child's preference for interacting with his world.

In some embodiments, a feed-forward neural network, which may have 3 layers, may be used for each of the machine learning models of machine learning layer 230 or some of the machine learning models. Other machine-learning models that may be employed in machine learning layer 230 include linear regression models; logistic regression models; linear discriminant analysis models; Naive Baynes models; Apriori models; K-means models; quadratic discriminant analysis models; K-nearest neighbor models, and Adaboost neural network models.

As an example, a neural network for a particular type of connection may be initially trained using a large set of ground-truth training data. Data bundles based on video, audio, and/or other metadata may be truth-tagged with a connection score that an expert has associated with the child's interactions with the world as present in the video, audio, and/or other metadata. Based on this truth-tagged training data set, the neural network may be trained in order to output a connection score, such as normalized between 0-1 or 1-100 for a particular type of connection. Since each machine learning model is targeted to a different type of connection, if the same data bundle is provided to each machine learning model, each machine learning model may output a different connection score particular to the type of connection of the particular machine learning model. In the illustrated example of FIG. 2, physical machine learning model 231 outputs a physical connection score indicative of the child's preference for physically interacting with his environment; social machine learning model 232 outputs a social connection score indicative of the child's preference for socially interacting with his environment; intelligence machine learning model 233 outputs an intelligence connection score indicative of the child's preference for interacting with his environment that requires intelligence; and physical machine learning model 234 outputs an emotional connection score indicative of the child's preference for emotionally interacting with his environment.

Score comparison engine 240 may be fed one or more score bundles from machine learning layer 230. Score comparison engine 240 may store the child's score bundles to child-score database 250. These scores may be averaged or otherwise combined over a period of time to get a more comprehensive bundle of scores representative of the child. In some embodiments, a long-term bundle of scores and a short-term bundle of scores may be maintained. For instance, a long-term bundle of scores may be indicative of the child's interactions with his environment over the past year, while the short-term bundle of scores may be indicative of the child's interactions with his environment over the past month.

Score comparison engine 240 may take the received score bundle that is mapped to the child (or the averaged or otherwise compiled score from data present in child-score database 250) and compare the score with the various entries of activity-score database 251. Activity-score database 251 may be a database of a large number of activities and associated connections scores for each activity. The activities included in activity-score database 251 can include activities such as: sports, instrument lessons, theatre activities, dance activities, technological activities (e.g., robotics camp), outdoor activities, scouting activities, media for viewing, media for listening to, media for interacting with, tutoring, lessons, volunteer activities, museums to visit, etc.

The connection scores for each activity can match the categories for which the particular child was ranked. The connection scores present in activity-score database 251 may be determined by one or more child development experts skilled in assessing activities to appropriately assign connection scores. Table 1 illustrates a few example entries that could be present in activity-score database 251. The values and connection scores presented in Table 1 are merely examples of possible scores and activities.

TABLE 1

| Activity | Physical Connection | Emotional Connection | Social Connection | Intelligence Connection |
|---|---|---|---|---|
| Soccer | 86 | 25 | 63 | 15 |
| Community Theatre for Kids | 22 | 77 | 76 | 68 |
| Child Chess Camp | 8 | 53 | 81 | 94 |
| Cub Scouts | 50 | 42 | 85 | 51 |

A closest match between the child's bundle of scores and an activity's bundle of scores may be determined. In some embodiments, a ranked list of the top 3, 5, 10, or some other number of best matches may be found. In order to find the best match or matches between the entries of activity-score database 251, an algorithm may be used to calculate the degree to which a child's bundle of scores matches each entry within activity-score database 251. For example, Equation 1 can be used to determine a matching score based on each form of connection, the lowest matching score representing the closest match.

$$\text{Match\_score} = (C_P - A_P)^2 + (C_E - A_E)^2 + (C_S - A_S)^2 + (C_I - A_I)^2 \quad \text{Eq. 1}$$

In Equation 1, C generally refers to a child's connection score and A refers to an activity's connection score. The subscript corresponds to the particular type of connection: P for physical; E for emotional; S for social; and I for intelligence. In equation 1, the lower the value of match_score, the closer the match is present between the activity and the child. Equation 1 represents an example of an algorithm that can be used to determine one or more closest matches. Other algorithms are also possible. Further, other algorithms may be created based on the number of connections, whether greater or fewer, present for the child and activities.

Communication output interface 260 may be configured to send a report, such as via an email, webpage, or application, for presentation to a caretaker of the child. The report may include information similar to that present in the embodiment of FIG. 3. The report may indicate the bundle of scores for the child (or, possibly, separate long-term and short-term scores) and may indicate one or more than one best matches of possible activities with the child's bundle of scores. In some embodiments, by accessing activity database 252, a link or information that allows the caretaker to sign the child up for the activity in the child's geographic region may be included. For instance, if the caretaker has provided a zip code where the child resides and one of the recommended activities is soccer, activity database 252 may be accessed to identify an age-appropriate soccer league in or near the child's geographic location. A link to sign up or contact information for the activity may be provided to the caretaker by communication output interface 260.

If the child ends up participating in one or more of the activities identified as a match, a feedback process may be performed to further assess the match between the child and the activity. Feedback subsystem 270 may gather feedback using one or more sources. Feedback may come from a caretaker of the child or from video, audio, and/or metadata of the child while performing the activity. For instance, if the activity is performed in-home, such as in-home instrument lessons or virtual art classes, home automation environment 120 can be used to monitor the child to see how he behaves during the activity. Specifically, particular characteristics of the child may be monitored, including: mood, amount of socialization during the activity, staying focused and not distracted, amount of effort, amount of questions about task asked, etc. Engagement engine 272 may analyze the output of first-layer processing 220 to identify how well the child is engaging with the activity based on such characteristics of the child.

In some embodiments, additional video, audio, and metadata may be gathered off-site from the child's home. For example, the operator of an activity may be actively participating in the childhood development system by having video, audio, and/or metadata captured at the site of the activity using a separate set of automation devices. This captured data may be transmitted to childhood development system 200 and analyzed similarly to video, audio, and/or metadata received from home automation environment 120. In some situations, a caretaker's mobile device may be used to capture video, audio, and/or metadata of the child during an activity.

Additionally or alternatively, feedback subsystem 270 may utilize another form of feedback that involves a caretaker (or other person, such as an instructor) interacting with questionnaire engine 271. Via a website, email-based survey, or an application executed on the caretaker mobile device, questionnaire engine 271 may cause a series of questions to be posed to the caretaker. The caretaker may be requested to observe the child's participation in the activity over one or more days and then provide answers to a set of questions posed by questionnaire engine 271. The answers provided to questionnaire engine 271 may be processed by engagement engine 272 in addition to or instead of feedback data obtained from first-layer processing 220.

Engagement engine 272 may perform several tasks. First, engagement engine 272 may determine whether the activity is truly a good match for the child. Such a determination may be based on the child's mood, the child's amount of socialization during the activity, the child staying focused and not distracted, the child's amount of effort on the activity, the child's amount of questions about task asked, etc. Such a determination can additionally or alternatively be based on the answers to the questions received via questionnaire engine 271. Engagement engine 272 may output a score or classification to communication output interface 260.

Communication output interface 260 may indicate to the caretaker whether or not the activity is a good match. If the activity is a good match, a complementing activity may be suggested by communication output interface 260 accessing child-score database 250 and activity database 252. If the activity is not a good match, one or more alternative activities that were not originally recommended may instead be recommended. As the child continues to be monitored based on video, audio, and/or metadata, the recommended activities may be intermittently or periodically updated. When a significant change in the child's scores is detected (e.g., a particular category changes by more than a threshold amount) that results in the activities that are recommended changing, the caretaker may receive a notification that the child's recommended activities have changed.

Figure 3:
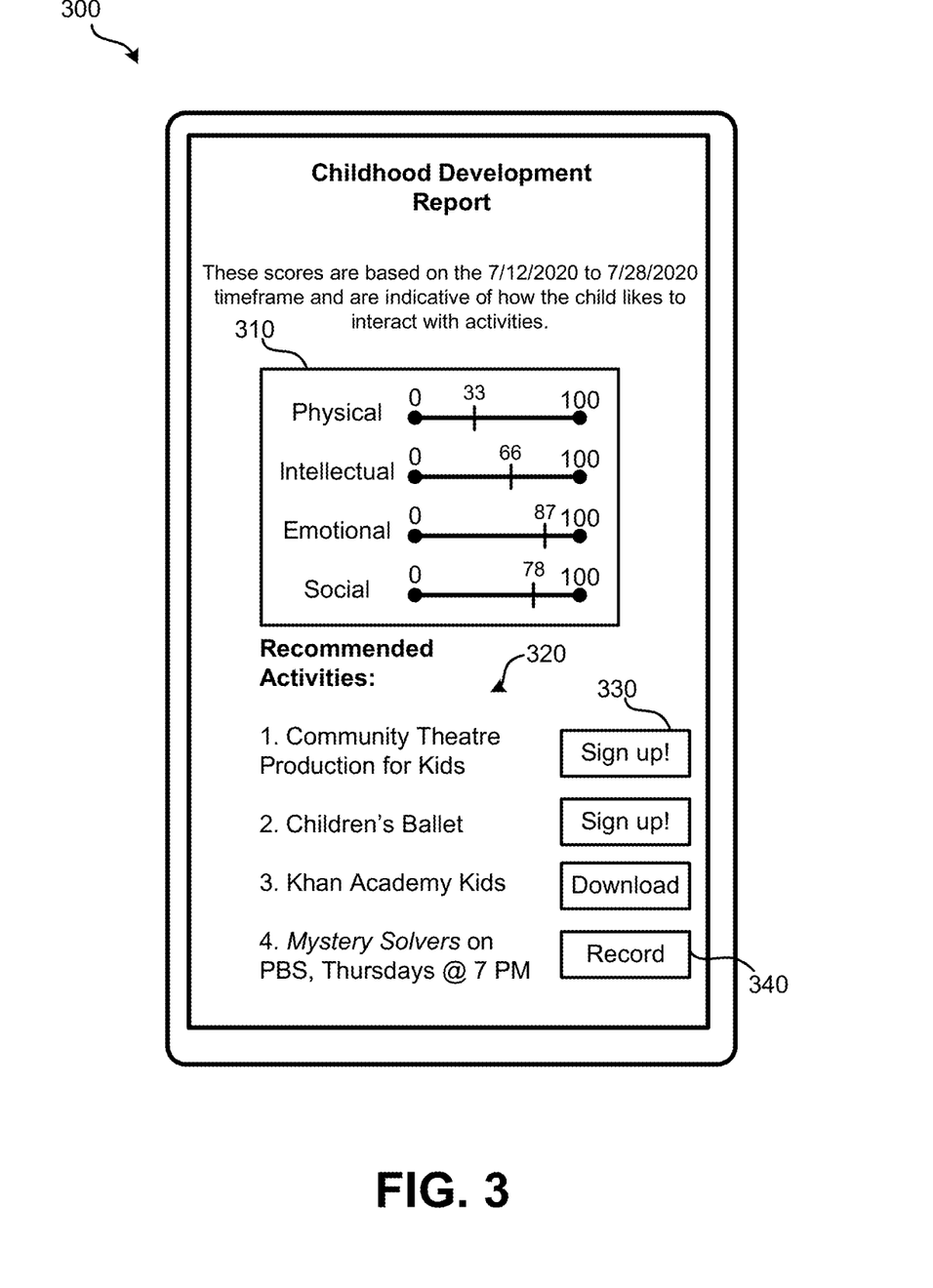
FIG. 3 illustrates an embodiment of a report prepared by the childhood development system.
Figure 4:
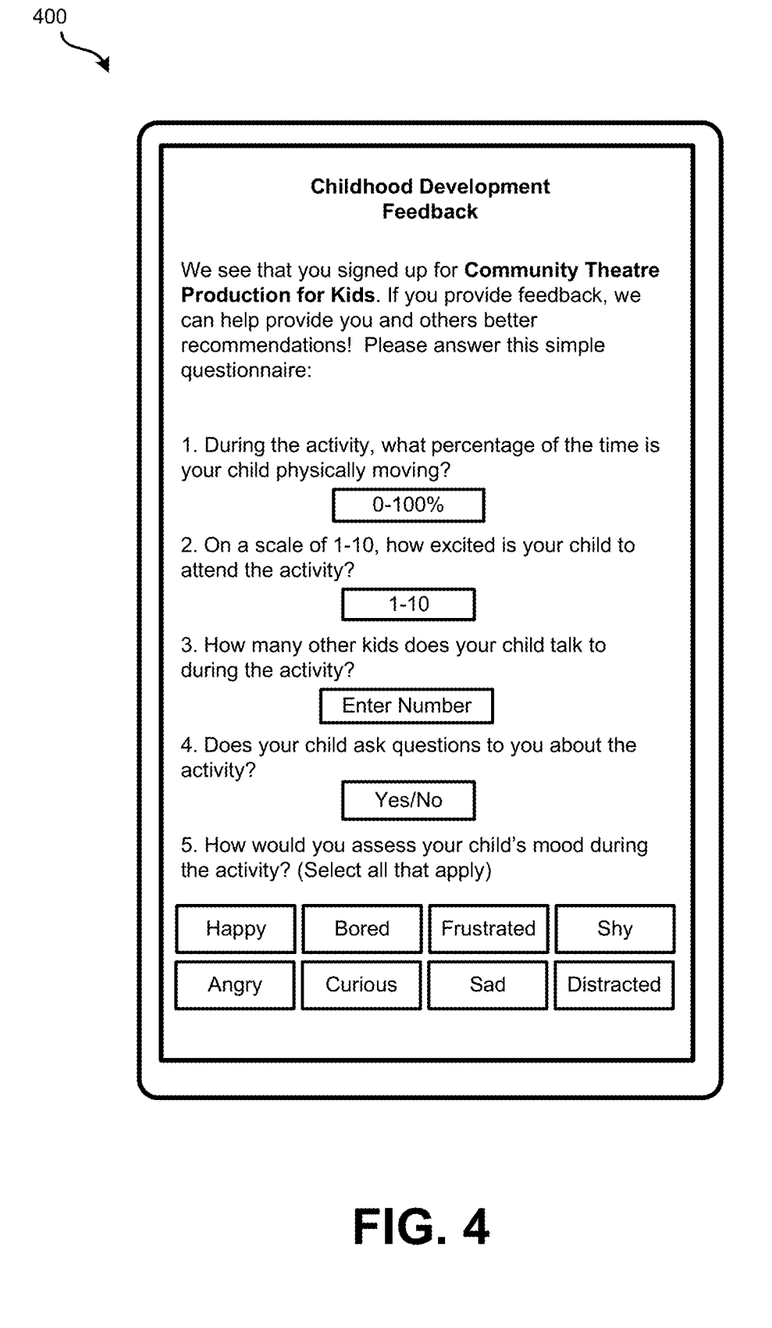
FIG. 4 illustrates an embodiment of a feedback questionnaire.

Examples of two possible interfaces that may be presented to a caretaker via a mobile device are presented in FIGS. 3 and 4. Such interfaces may be presented via a website that is accessed by a computerized device (e.g., smartphone, desktop computer, etc.) and/or a dedicated application, such as childhood development application 132 of FIG. 1. The embodiments of FIGS. 3 and 4 are examples as to what information is presented. The layout and format of such information can vary by embodiment. Further, in other embodiments, greater or less information can be presented. FIG. 3 illustrates an embodiment 300 of a report prepared by the childhood development system for presentation on a mobile device.

Region 310 indicates the child's bundle of scores. In some embodiments, short-term and long-term scores may be presented separately or overlaid as part of the same graphic. Recommended activities 320 may include some number of the best matches that were identified for the child based on his score bundle. For each activity for which it is available, element 330 is provided that either links the caretaker to an interface that allows the child to be signed up for the activity or provides contact information for an operator that provides the activity in the geographic region of the child.

In some embodiments, one or more of the activities may be television programming that is determined to match the child's bundle of scores. While a child's primary activity during the day probably should not be watching television, a caretaker may appreciate being informed of one or more television programs that are a good fit for the child. In some embodiments, the caretaker may be provided with element 340 that allows the caretaker to schedule recording of the recommended programming. In some embodiments, the television channel, program title, and broadcast date/time can be indicated. Other forms of content recommendations are also possible, such as for on-demand video content; on-demand audio content; internet-based radio stations; radio stations; YouTube channels and equivalent, children-appropriate websites; smart-device applications that can be acquired from an app store; etc.

FIG. 4 illustrates an embodiment 400 of a feedback questionnaire presented on a mobile device. A caretaker may be requested to complete the questionnaire of embodiment 400 while or after the child has participated in a recommended activity. Various questions may be asked, such as those indicated in FIG. 4. Additional questions may be presented based on the feedback provided by the caretaker. Answers provided by the caretaker may be received by questionnaire engine 271 of feedback subsystem 270. The answers provided by the caretaker may be used to assess not only the child, but whether the activity is generally enjoyed by many children and/or if the specific program in the geographic area of the child is liked by many children. Therefore, the feedback provided by the caretaker can be used to adjust whether the activity that the child is participating in is more or less frequently recommended to others.

Figure 5:
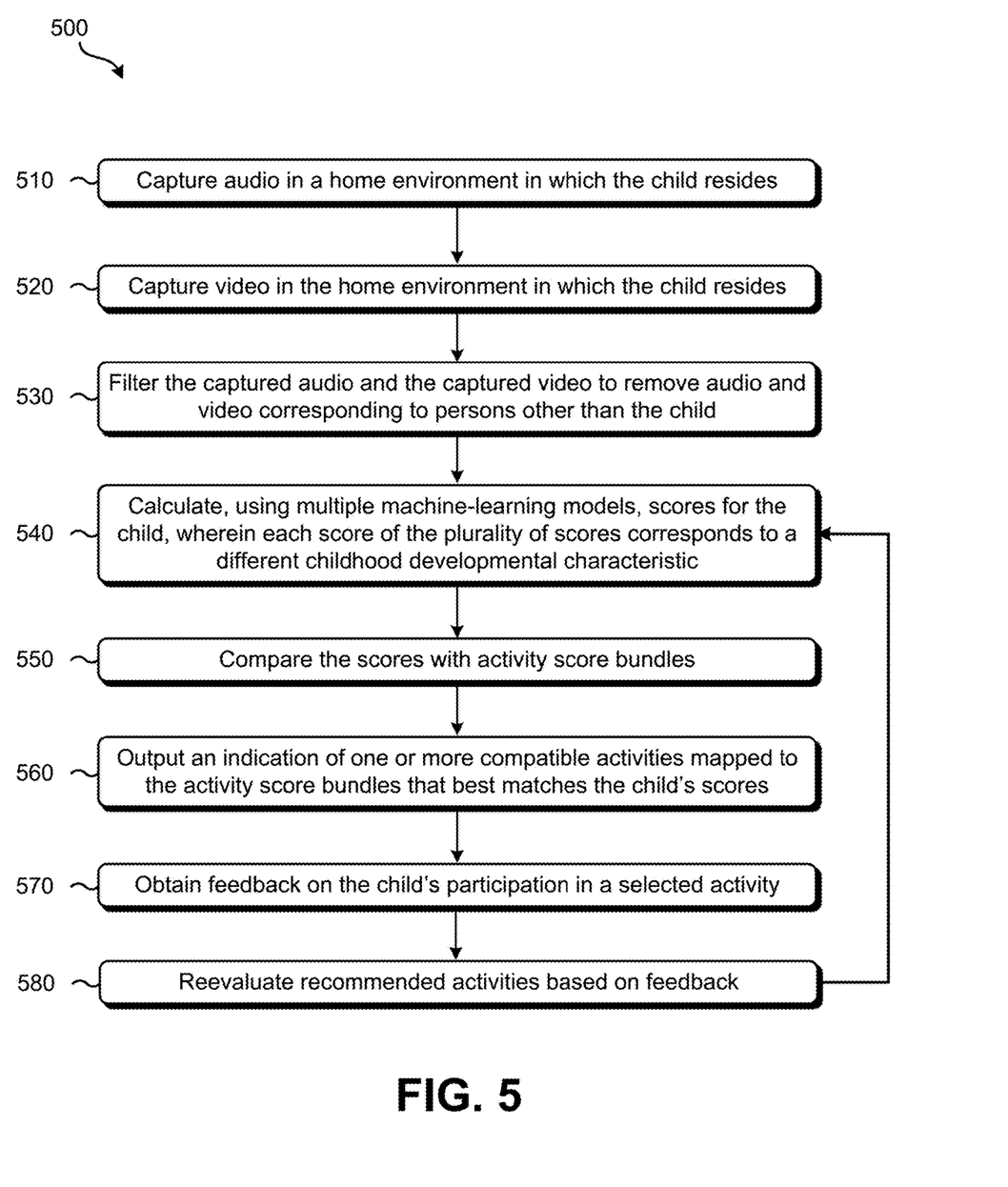
FIG. 5 illustrates an embodiment of a method for enrolling a child with a compatible activity.

Various methods may be performed using the systems and interfaces of FIGS. 1-4. FIG. 5 illustrates an embodiment of a method 500 for enrolling a child with a compatible activity. Method 500 may be performed using system 100 and/or system 200 of FIGS. 1 and 2.

At block 510, audio can be captured using one or more devices, such as home automation devices, in a home environment in which the child resides. Additionally or alternatively, audio may be captured using a mobile device of a caretaker of the child, such as while the child plays in a park. At block 520, video can be captured using one or more devices, such as home automation devices, in the home environment in which the child resides. Additionally or alternatively, video may be captured using the mobile device of the caretaker of the child, such as while the child plays in the backyard or is at recess at daycare. In addition or in alternate to blocks 510 and 520, other forms of data, referred to as metadata, may be captured using home automation devices that is indicative of the child interacting with his environment, such as using media and gaming devices, listening to music, etc.

At block 530, captured video, captured audio, and/or metadata may be filtered as detailed in relation to child-based filtering 210 to remove captured data that corresponds exclusively to persons other than the child. Such filtering may help target the child and maintain the privacy of others that live and play near the child.

At block 540, multiple levels of processing on video, audio, and/or metadata that correspond to the child may be performed. A first layer of processing may include a computer vision process being performed on video, an audio analysis being performed, and/or some other form of analysis on metadata. The output of the first-layer of processing may be features appropriate to be analyzed by multiple machine-learning models. The second layer of processing can include multiple machine-learning models evaluating the features to determine a bundle of scores for the child. The child may be assigned a score in multiple areas of connection, such as the child's desire to physically connect with his environment, socially connect with his environment, use intelligence to connect with his environment, and/or emotionally connect with his environment. Each machine learning model may weigh and consider the features differently to provide a separate score for the model's specific type of connection evaluated.

At block 550, a comparison may be performed between the child's calculated bundle of scores and scores that have been mapped to activities. A database may be accessed that has scores stored for many activities. In some embodiments, the activities are filtered based on availability in the child's geographic region and/or availability at the time (e.g., if signups are not open or scheduled to open relatively soon for a particular activity, the activity may be filtered out). A scoring algorithm may be used, such as Equation 1, to compute a match between the child's scores and each activity's score. From this comparison, some number of the best matches may be identified.

At block 560, one or more of the best matches may be output for presentation to a caretaker, such as via a dedicated childhood development application, via an email, via a webpage, etc. The child's bundle of scores itself may also be presented, such as indicated in FIG. 3. The caretaker may be given the opportunity to sign up for the activity or otherwise schedule the activity for participation, recording, attendance, etc.

During or after the child having participated in a recommended activity, at block 570, feedback on the child's participation in the selected activity may be sought. The feedback may be obtained from video, audio, and/or metadata collected while the child was participating in the activity. Alternatively or additionally, a caretaker (or other trusted observer) may provide feedback on the child's participation in the activity, such as detailed in relation to FIG. 4.

At block 580, based on the feedback received or provided, the recommended activities may be adjusted. If the child enjoys the recommended activity, the child's bundle of scores may be confirmed as relatively accurate. If the child does not enjoy the recommended activity, the child's bundle of scores may be recalculated using updated data and/or different activities may be recommended, such as activities that are associated with stronger connections in different categories than the activity in which the child participated.

While the male pronoun "he" is used throughout this document, the embodiments can be applied equally to female children and female caretakers. The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for enrolling a child with a compatible activity, the method comprising:
    capturing, using at least some of a plurality of home automation devices, audio in a home environment in which the child resides;
    capturing, using at least some of the plurality of home automation devices, video in the home environment in which the child resides;
    filtering the captured audio and the captured video to remove audio and video corresponding to persons other than the child;
    based upon information from the filtered video and the filtered audio, calculating, using a plurality of trained machine-learning models, a plurality of scores for the child, wherein each score of the plurality of scores corresponds to a different childhood developmental characteristic;
    comparing the plurality of scores with a plurality of activity score bundles; and
    outputting an indication of the compatible activity mapped to an activity score bundle of the plurality of activity score bundles that best matches the plurality of scores.

2. The method for enrolling the child with the compatible activity of claim 1, wherein:
    a first trained machine-learning module of the plurality of trained machine-learning models scores a physical confidence of the child;
    a second trained machine-learning module of the plurality of trained machine-learning models scores a social confidence of the child;
    a third trained machine-learning module of the plurality of trained machine-learning models scores an intellectual confidence of the child; and
    a fourth trained machine-learning module of the plurality of trained machine-learning models scores an emotional confidence of the child.

3. The method for enrolling the child with the compatible activity of claim 2, wherein each of the plurality of trained machine-learning models are pre-trained feed-forward neural networks.

4. The method for enrolling the child with the compatible activity of claim 3, the method further comprising: prior to calculating the plurality of scores for the child, performing a computer vision process to identify visual characteristics of a scene that comprises the child, wherein the identified visual characteristics are used as part of the information to calculate the plurality of scores for the child.

5. The method for enrolling the child with the compatible activity of claim 4, the method further comprising: prior to calculating the plurality of scores for the child, performing an audio analysis to identify auditory characteristics of the scene that comprises the child, wherein the identified auditory characteristics are used as part of the information to calculate the plurality of scores for the child.

6. The method for enrolling the child with the compatible activity of claim 1, further comprising, after outputting the indication of the compatible activity and after the compatible activity has started being performed by the child:
capturing audio of the child performing the compatible activity;
capturing video of the child performing the compatible activity;
filtering the captured audio and the captured video of the child performing the compatible activity to remove audio and video corresponding to persons other than the child; and
based upon information from the filtered video and the filtered audio, determining an engagement level of the child with the compatible activity.

7. The method for enrolling the child with the compatible activity of claim 1, further comprising, after outputting the indication of the compatible activity and after the compatible activity has started being performed by the child:
providing, via a mobile device, a questionnaire to a caregiver of the child, wherein the questionnaire requests feedback about the child's involvement in the compatible activity.

8. The method for enrolling the child with the compatible activity of claim 7, further comprising, after outputting the indication of the compatible activity and after the compatible activity has started being performed by the child:
receiving, from the mobile device, responses to the questionnaire; and
recommending a second activity for the child at least partially based on the responses to the questionnaire and the plurality of scores.

9. The method for enrolling the child with the compatible activity of claim 1, further comprising:
capturing biometric data for the child, wherein calculating the plurality of scores for the child is further based on the captured biometric data for the child.

10. The method for enrolling the child with the compatible activity of claim 1, wherein outputting the indication of the compatible activity mapped to the activity score bundle of the plurality of activity score bundles that best matches the plurality of scores comprises:
outputting a report that indicates the plurality of scores, the compatible activity, and an option to enroll the child in the compatible activity.

11. The method for enrolling the child with the compatible activity of claim 10, further comprising:

after outputting the report, outputting a notification that a change in compatible activities identified for the child have been identified.

12. The method for enrolling the child with the compatible activity of claim 1, wherein each activity score bundle of the plurality of activity score bundles defines at least four scores, comprising a physical confidence score, an emotional confidence score, a social confidence score, and an intellectual confidence score.

13. A childhood development system, comprising:
a plurality of home automation devices distributed within a home environment in which a child resides; and
a childhood development server system that wirelessly communicates with the plurality of home automation devices;
one or more memories; and
one or more processors communicatively coupled to the one or more memories, configured to:
capture, using at least some of the plurality of home automation devices, audio in the home environment in which the child resides;
capture, using at least some of the plurality of home automation devices, video in the home environment in which the child resides;
filter the captured audio and the captured video to remove audio and video corresponding to persons other than the child,
based upon information from the filtered video and the filtered audio, calculating, using a plurality of trained machine-learning models, a plurality of scores for the child, wherein each score of the plurality of scores corresponds to a different childhood developmental characteristic;
compare the plurality of scores with a plurality of activity score bundles; and
output an indication of a compatible activity mapped to an activity score bundle of the plurality of activity score bundles that best matches the plurality of scores.

14. The childhood development system of claim 13, wherein:
a first trained machine-learning module of the plurality of trained machine-learning models scores a physical confidence of the child;
a second trained machine-learning module of the plurality of trained machine-learning models scores a social confidence of the child;
a third trained machine-learning module of the plurality of trained machine-learning models scores an intellectual confidence of the child;
a fourth trained machine-learning module of the plurality of trained machine-learning models scores an emotional confidence of the child; and
each activity score bundle of the plurality of activity score bundles defines at least four scores, comprising a physical confidence score, an emotional confidence score, a social confidence score, and an intellectual confidence score.

15. The childhood development system of claim 14, wherein each of the plurality of trained machine-learning models are pre-trained feed-forward neural networks.

16. The childhood development system of claim 15, wherein the one or more processors are further configured to perform a computer vision process to identify visual characteristics of a scene that comprises the child prior to calculating the plurality of scores for the child, wherein:

the identified visual characteristics are used as part of the information to calculate the plurality of scores for the child.

17. The childhood development system of claim 16, wherein the one or more processors are further configured to perform an audio analysis to identify auditory characteristics of the scene that comprises the child prior to calculating the plurality of scores for the child, wherein the identified auditory characteristics are used as part of the information to calculate the plurality of scores for the child.

18. The childhood development system of claim 13, wherein the one or more processors are further configured to, after outputting the indication of the compatible activity and after the compatible activity has started being performed by the child:
 filter captured audio and captured video of the child performing the compatible activity to remove audio and video corresponding to persons other than the child; and
 based upon information from the filtered video and the filtered audio, determine an engagement level of the child with the compatible activity.

19. The childhood development system of claim 13, wherein the one or more processors are further configured to:
 provide, via a mobile device, a questionnaire to a caregiver of the child, wherein the questionnaire requests feedback about the child's involvement in the compatible activity;
 receive, from the mobile device, responses to the questionnaire; and
 recommend a second activity for the child at least partially based on the responses to the questionnaire and the plurality of scores.

20. The childhood development system of claim 13, wherein the one or more processors being configured to output the indication of the compatible activity mapped to the activity score bundle of the plurality of activity score bundles that best matches the plurality of scores comprises the one or more processors configured to:
 output a report that indicates the plurality of scores, the compatible activity, and an option to enroll the child in the compatible activity.

* * * * *